United States Patent [19]

Anderson, deceased

[11] Patent Number: 4,564,104
[45] Date of Patent: Jan. 14, 1986

[54] ARTICLE FEEDING AND STACKING MECHANISM

[75] Inventor: Andrew W. Anderson, deceased, late of West Caldwell, N.J., by Miriam Anderson, executrix

[73] Assignee: Scandia Packaging Machinery Co., Clifton, N.J.

[21] Appl. No.: 518,890

[22] Filed: Aug. 1, 1983

[51] Int. Cl.[4] .............................................. B65G 47/26
[52] U.S. Cl. ................................................... 198/422
[58] Field of Search ............... 198/422, 418, 419, 404, 198/461, 410, 423, 459, 406, 408, 624, 462; 53/540, 542, 533; 414/38

[56] References Cited

U.S. PATENT DOCUMENTS

| | | | |
|---|---|---|---|
| 2,570,265 | 10/1951 | Nordquist et al. | 198/461 X |
| 2,905,341 | 9/1959 | Anderson | 414/38 |
| 3,923,142 | 12/1975 | Rysti | 198/461 |
| 4,020,614 | 5/1977 | Smithers | 198/462 X |
| 4,228,888 | 10/1980 | Bruno | 198/461 |

FOREIGN PATENT DOCUMENTS 2223005 2/1973 Fed. Rep. of Germany ........ 53/540
2850456 8/1979 Fed. Rep. of Germany ...... 198/459

Primary Examiner—Joseph E. Valenza
Assistant Examiner—Jon Holmes
Attorney, Agent, or Firm—Neil F. Markva

[57] ABSTRACT

An article feeding and stacking mechanism for receiving a series of articles from a conveyor and then collating the articles for subsequent cartoning or other disposition. A first indexing or collating wheel lifts the articles from the delivery end of the conveyor and stacks or deposits one or more of the articles on an intermediate support. The articles are then lifted by a second indexing or collating wheel and deposited or stacked in predetermined arrangement on a table for subsequent handling. A pair of control guide wheels are positioned above the collating wheels for restraining or limiting unwanted movement of the articles as they are being handled by the collating wheels. The collating wheels have cut-out or recessed portions at that portion of their support surfaces which would normally engage the edge of the articles, whereby the edges of the articles are not damaged by excessive pressure against the collating wheel support surfaces.

9 Claims, 5 Drawing Figures

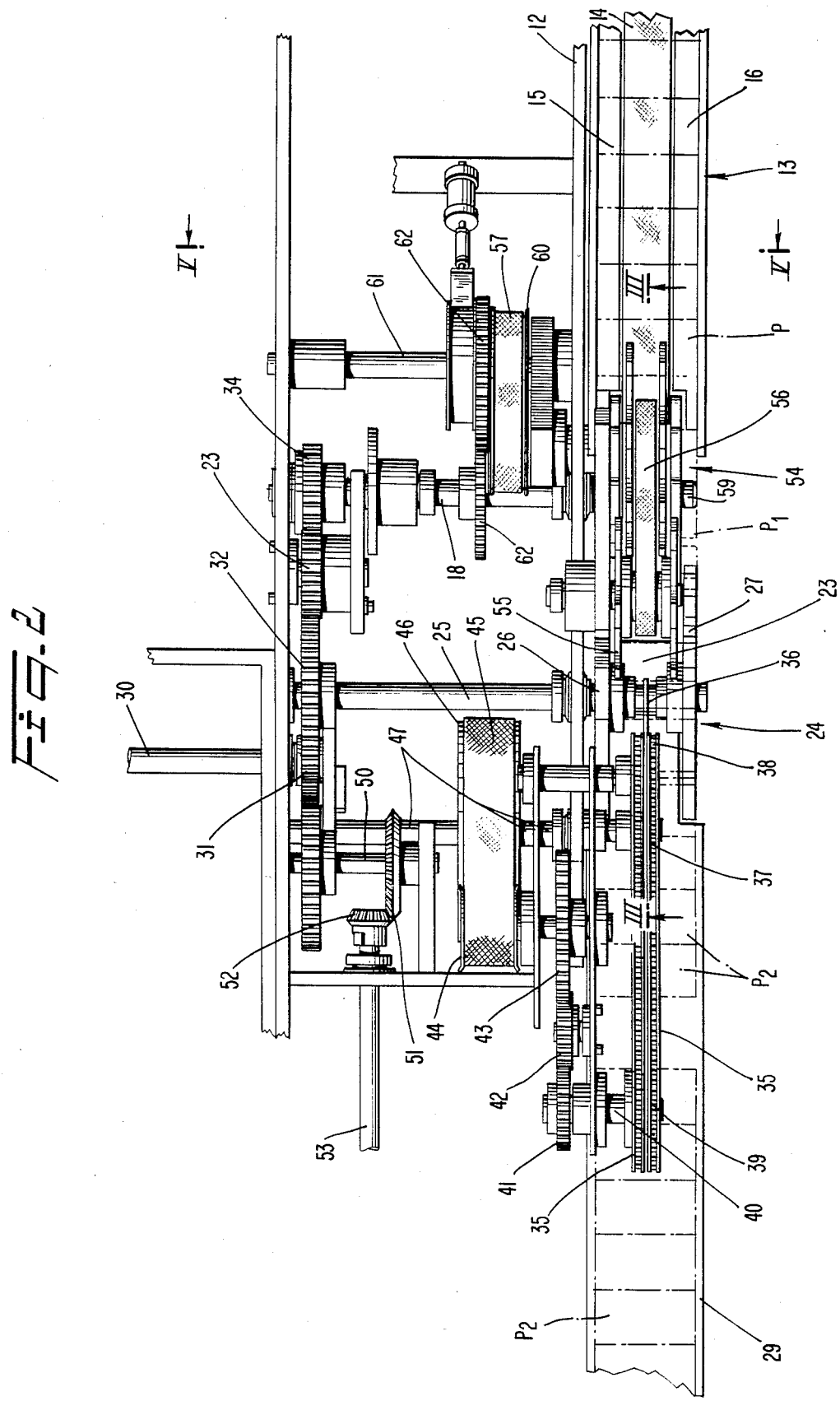

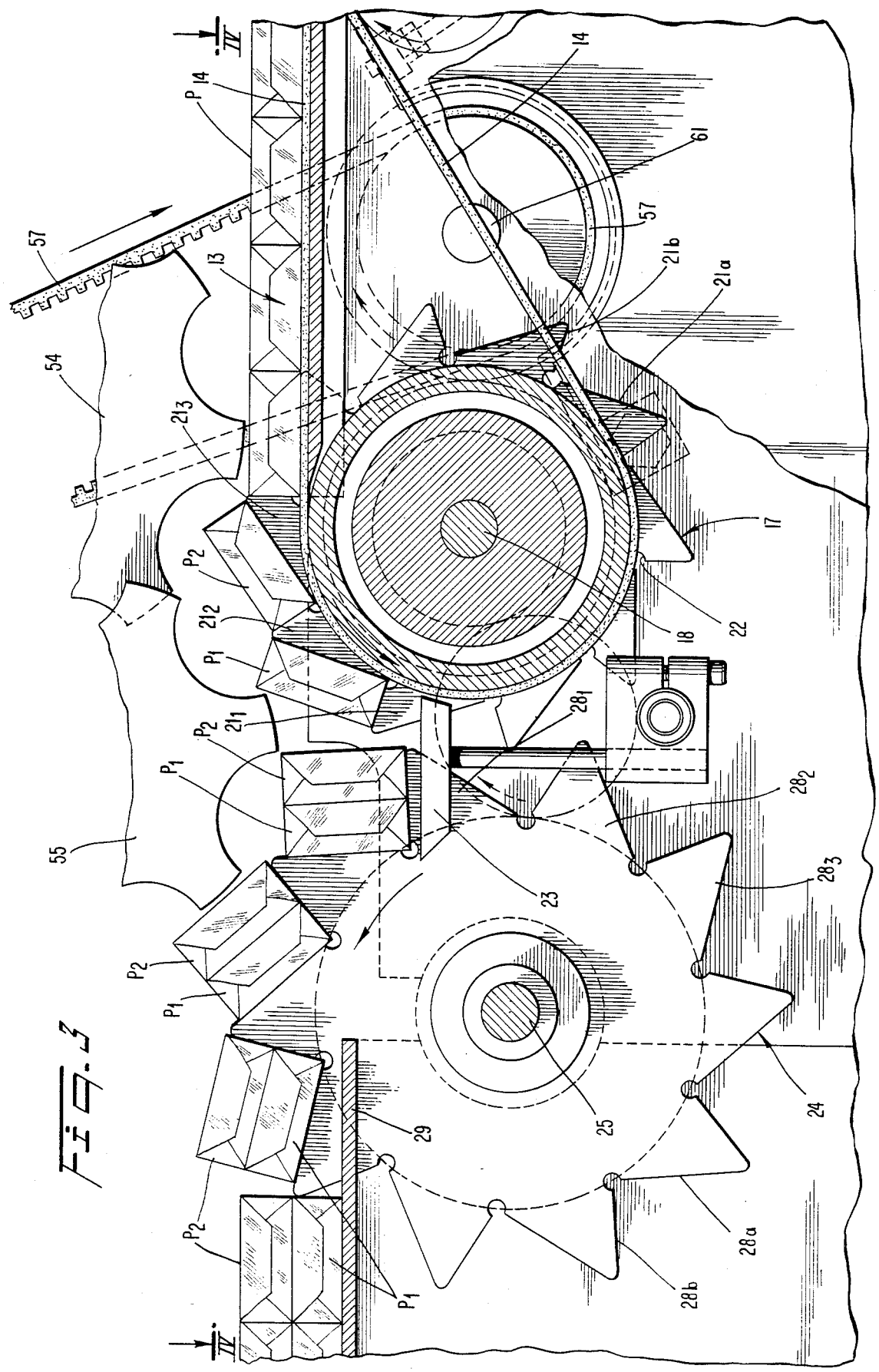

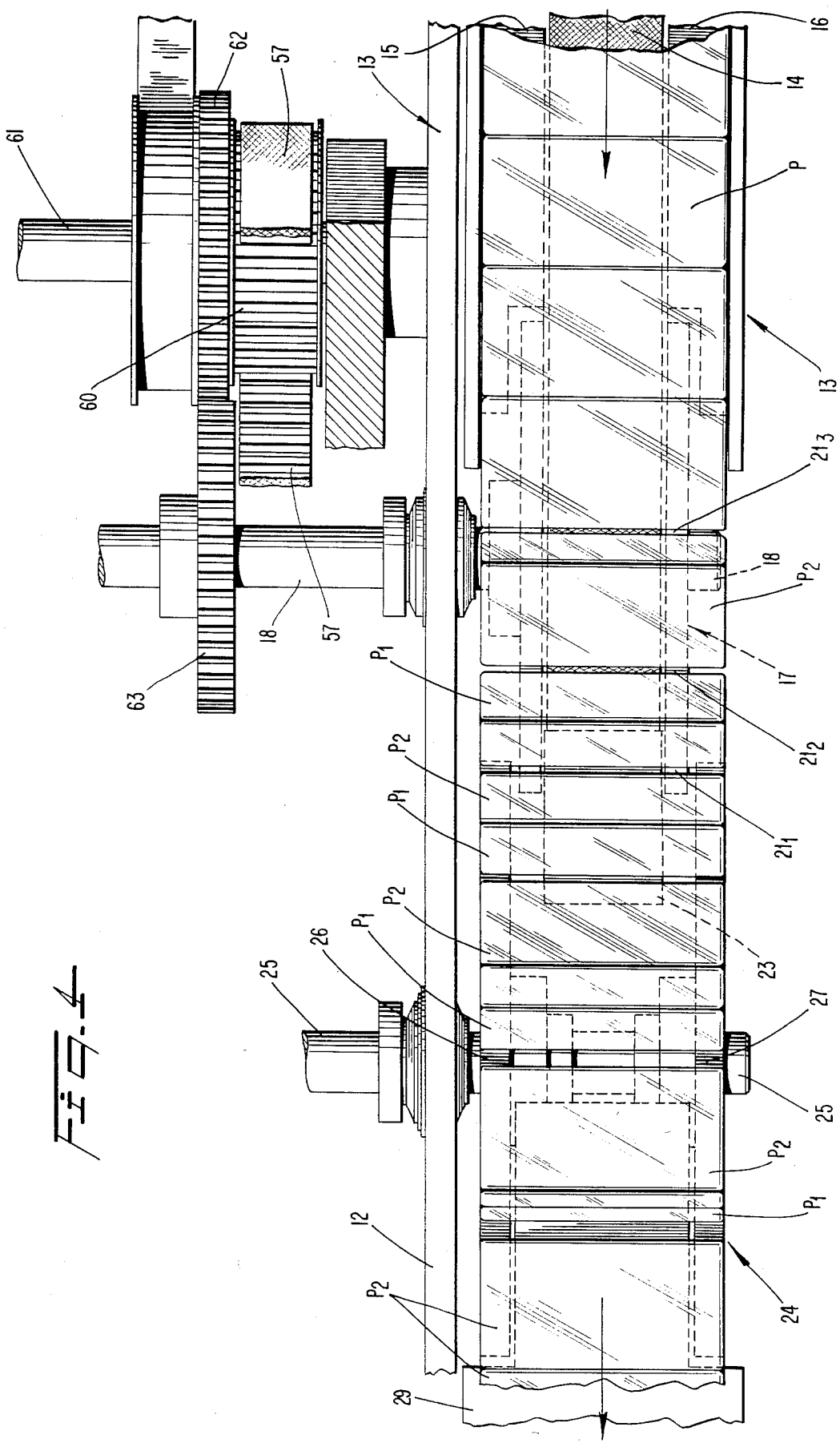

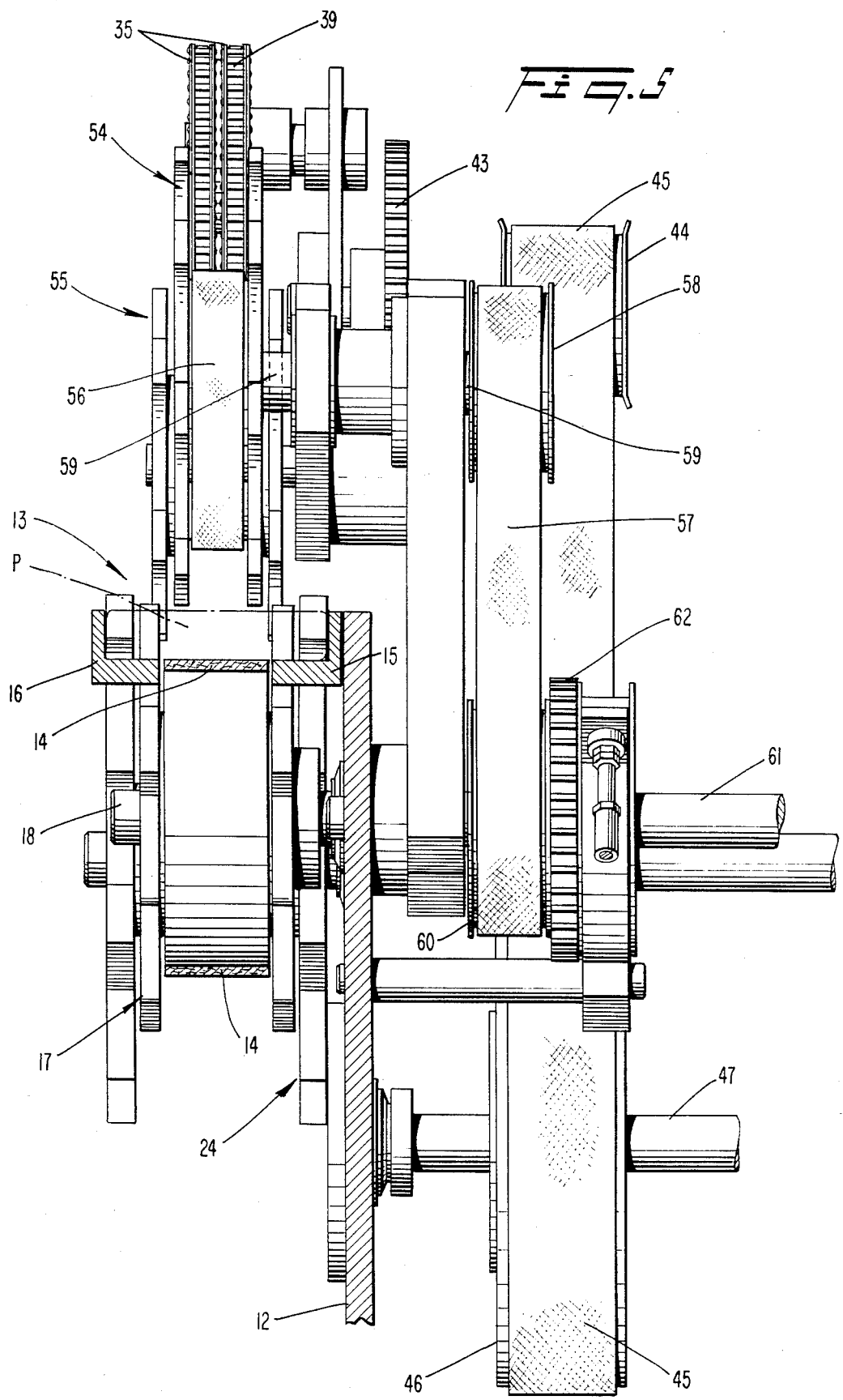

ARTICLE FEEDING AND STACKING MECHANISM

BACKGROUND OF THE INVENTION

This invention relates to a mechanism for collating articles. More particularly, the invention is used in cigarette packaging machines, wherein the individual packages of cigarettes are received from a conveyor and are stacked or collated in a predetermined number and arrangement for subsequent cartoning, and represents an improvement over earlier U.S. Pat. No. 2,905,341.

As disclosed in U.S. Pat. No. 2,905,341, cigarette packages are conventionally received from a conveyor by a pair of collating or index wheels which stack and arrange the packages on a table for subsequent cartoning. These wheels have support ledges or surfaces which engage the packages of cigarettes during the transference of the packages from the conveyor to the table. Due to the nature of the supporting contact, it is possible that the edges of the packages may become damaged. Moreover, other improvements in such machines enable them to be run at a much higher speeds than before. Thus, with the former structure, displacement of the packages from the wheels may occur during such high speed operation. In the former instance, the damaged packages may not be suitable for sale, and in the latter instance, it may be necessary to shut down or maintain a slower pace for the production machinery.

PURPOSE OF THE INVENTION

The primary object of this invention is to provide a high speed collating machine for assembling articles received from a delivery conveyor, wherein the machine is simple and economical in construction and has means for preventing edge damage to the articles during handling.

Another object of the invention is to provide an article handling machine wherein means is provided to prevent unwanted displacement of the articles from the machine during handling by the machine.

A further object of the invention is to provide an article handling machine for receiving and collating or stacking a series of articles, such as cigarette packages. A pair of collating wheels are arranged to lift the articles from the conveyor and stack or arrange the articles onto a table for subsequent processing, such as cartoning. Further, the wheels have means for preventing edge damage to the packages as they are lifted and assembled by the wheels, and guide means is located adjacent to the wheels for preventing displacement of the packages from the wheels as the wheels are rotated.

SUMMARY OF THE INVENTION

These objects and other advantages are accomplished by the machine or mechanism for collating articles as described herein. A first index or collating wheel is located at the delivery end of a conveyor for lifting the articles, one-by-one, from the conveyor. The first collating wheel has a plurality of article-engaging surfaces which engage and support the articles as the wheel is rotated to deposit the articles onto an intermediate platform in a predetermined timed sequence. A second index or collating wheel is located adjacent to the first wheel and the intermediate platform. The second wheel rotates in a predetermined timed relationship to the first wheel to receive a plurality of the articles from the intermediate platform and deposit them onto a table in a predetermined number and arrangement for subsequent processing, such as cartoning.

Each wheel includes recessed areas in positions corresponding to the locations of the edges of articles supported on the supporting surfaces of the wheels to prevent edge damage to the articles. A plurality of control guide wheels with peripheral arcuate guide pockets or recesses are mounted adjacent to the collating wheels. The control guide wheels rotate in timed relationship with the collating wheels to prevent unwanted displacement of the articles from the rotating collating wheels which receive and assemble the articles. Thus, the machine runs at high operating speeds without damaging or dislodging articles being handled thereby and production efficiency is improved while costs are kept low.

BRIEF DESCRIPTION OF THE DRAWINGS

Other objects of this invention will appear in the following description and appended claims, reference being made to the accompanying drawings forming a part of the specification, and wherein like reference characters designate corresponding parts in the several views.

FIG. 2 is a sectional view of the mechanism along line II—II of FIG. 3;

FIG. 3 is a sectional view along line III—III of FIG. 2 showing the collating wheels and guide wheels, and their relationship to one another and to the delivery tracks or conveyor and the take-up or receiving table;

FIG. 4 is a fragmentary top plan view of the guide wheels and indexing or collating wheels, showing their operative relationship to one another; and FIG. 5 is a sectional view along line V—V of FIG. 2.

DESCRIPTION OF SPECIFIC EMBODIMENTS

Figure 1:
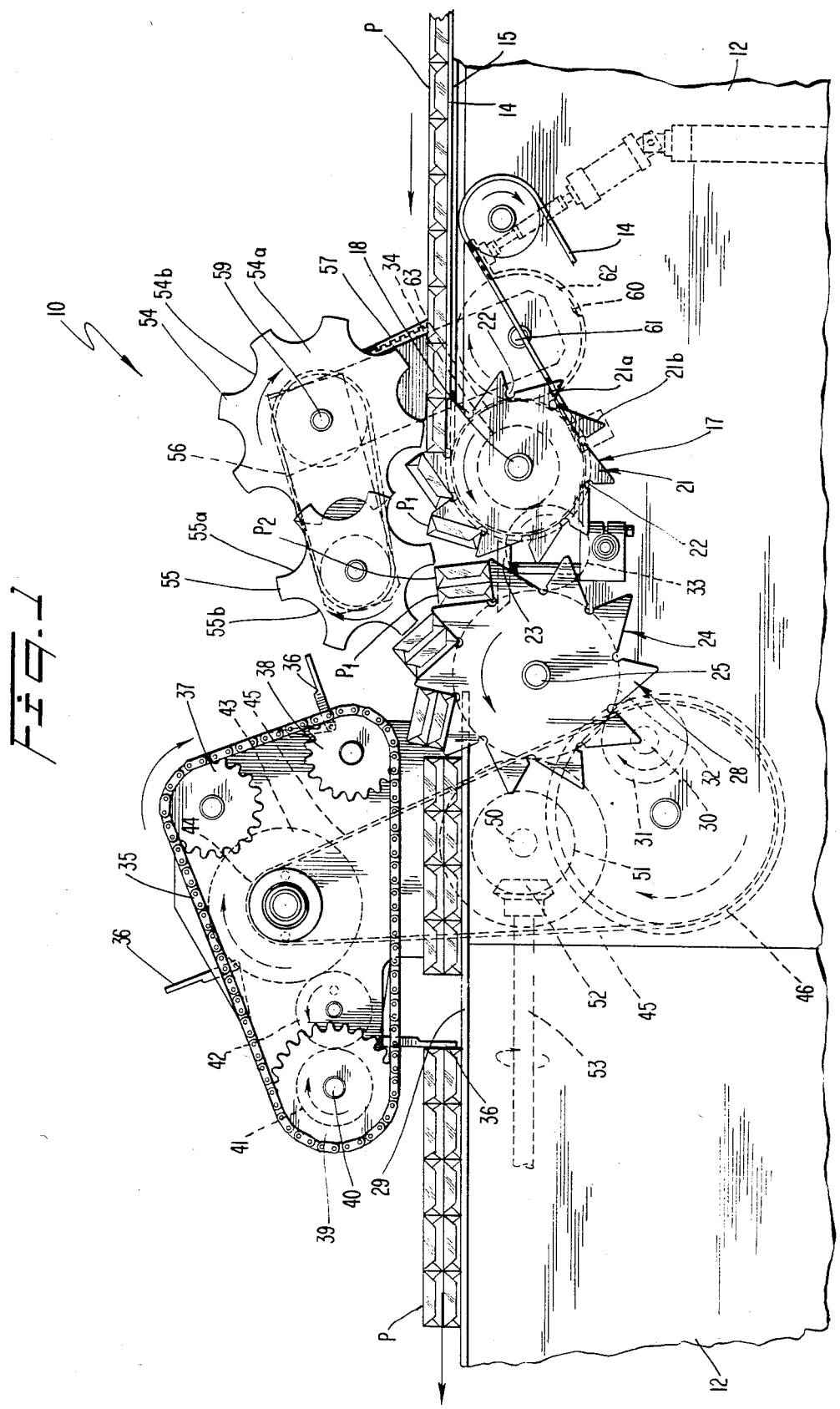
FIG. 1 is a side elevational view of a collating mechanism made in accordance with this invention.

More specifically, the article feeding and stacking mechanism or collating machine, generally designated 10, receives and assembles a plurality of packages or articles P, such as cigarette packages in predetermined stacked relationship for a subsequent cartoning operation. The present embodiment of the invention receives a continuously fed line of single packages P and arranges them in groups of double stacked rows of five packages each. Thus, a total of ten packages in each group is fed to a cartoning machine (not shown).

The package support comprises a base 11 and a back plate 12. A single-line conveyor 13 on one end of the apparatus feeds packages P to the collating mechanism 10. Conveyor 13 comprises an endless belt 14 arranged between a pair of spaced, parallel rails 15 and 16 on which the opposite ends of packages P rest while being transported by belt 14.

A first indexing or collating wheel 17 is rotatably mounted on a shaft 18 and comprises a pair of spaced, parallel disks 19 and 20 each having a plurality of projections $21_1$, $21_2$, $21_3$ ... $21_{10}$ defining intersecting support surfaces $21a$ and $21b$ disposed at substantially right angles with respect to one another. Each pair of intersecting surfaces $21a$ and $21b$ defines an article support pocket.

As shown in FIGS. 1 and 2, disks 19 and 29 project into the spaces between the edges of belt 14 and rails 15 and 16. The elevation of indexing wheel 17 relative to the elevation of conveyor 13 is such that support surfaces $21a$ and $21b$ sequentially pass through a point at which they are parallel to the top surface of belt 14. Thus, support surfaces 21a and 21b engage and lift packages P one at a time from conveyor belt 14. A notch or recess 22 located at the intersection of support surfaces 21a and 21b protects the edges of packages P against damaging contact with support surfaces 21a and 21b. In other words, with the structure of the disks or wheels as shown, substantial line or surface contact is made between the support surfaces 21a and 21b and packages P. As the indexing or collating wheel 17 continues to rotate, support surfaces 21a and 21b pass an intermediate platform or table 23 on which the packages P are deposited.

A second indexing or collating wheel 24 is mounted on a shaft 25 for rotation in overlapping relationship with wheel 17. Wheel 24 comprises a pair of disks 26 and 27 having a plurality of projections $28_1$, $28_2$, $28_3$ . . . $28_{10}$ each defining a pair of intersecting support surfaces 28a and 28b for engaging and supporting the packages. Each pair of intersecting surfaces 28a and 28b defines an article support pocket. As wheel 24 rotates the support surfaces 28a and 28b sequentially pass platform 23, lifting packages P from platform 23 and depositing them onto a table 29. Packages P are moved along table 29 for subsequent handling in a cartoning machine (not shown).

As noted previously, collating mechanism 10 is designed to arrange and stack ten (10) packages P on table 29 in double, stacked rows for subsequent movement to a cartoning machine. To achieve this, wheels 17 and 24 each have ten (10) respective projections 21 and 28, thereon. A gear train imparts a predetermined timed rotational movement to the wheels 17 and 24. This gear train includes an input shaft 30 and drive gear 31 meshed with a driven gear 32 on shaft 25. Gear 32 is, in turn, meshed with an intermediate gear 33 which engages a gear 34 on shaft 18. The gears are selected such that wheels 17 and 24 both turn in the same direction, with wheel 17 turning once for each carton of cigarettes (or ten packages) and wheel 24 turning a half rotation for each carton.

As shown in FIG. 3, when a package P is deposited from a first projection $21_1$ onto platform 23, continued movement of wheel 17 results in a subsequent projection $21_2$ engaging and nudging package P inwardly along the platform 23. The timed relation of wheel 24 to wheel 17 is such that two packages $P_1$ and $P_2$ will be deposited onto platform 23 before they are engaged and lifted toward table 29 by a projection $28_k$. Further, packages P are disposed in a flat orientation as they are delivered by conveyor 13, are turned into an edgewise relationship as they are stacked two deep onto platform 23. Each stack of two is again turned into a flat orientation as they are deposited on table 29 for grouping ten (10) of the packages while stacked two deep.

An endless chain 35 is mounted above table 29 and carries a plurality of pusher bars or fingers 36 which engage and push the stacked packages along table 29 to a position from which they are subsequently engaged and moved laterally to a cartoning machine. In the construction shown, chain 35 is disposed over two idler sprockets 37 and 38 and drive sprocket 39. The drive sprocket 39 is mounted on a shaft 40 having a driven gear 41 fixed thereon and meshed with an intermediate gear 42. The intermediate gear 42 is meshed with a drive gear 43 carried on a shaft having a pulley 44 fixed thereon. A belt 45 is disposed over the pulley 44 and over a pulley 46 fixed on a shaft 47, which also has a driven gear 48 fixed thereon. The gear 48 engages a drive gear 49 fixed on a shaft 50 which carries a bevel gear 51 meshed with pinion 52 on input shaft 53.

In order to keep packages P from flying off of the wheels 17 and 24 which operate at high speeds, a pair of control guide wheels 54 and 55 are mounted for rotation adjacent the top side of wheels 17 and 24 in close proximity thereto. Each wheel 54 and 55 has a plurality of arcuately shaped guide surfaces or pockets 54a, 54b, etc. and 55a, 55b, etc., respectively, which are brought into positions corresponding to the positions of the packages as the are carried around by the wheels 17 and 24. In other words, the timed rotation of the wheels 54 and 55 is such that the arcuate pockets travel adjacent the packages to constrain the fly-away movement of the packages. Timed rotation of the second guide wheel 55 relative to the first guide wheel 54 and to the first and second indexing or collating wheels 17 and 24 is accomplished by a timing belt 56 disposed over the hub of wheel 55 and over hub of wheel 54. Timed rotation of wheel 54 is achieved by a timing belt 57 disposed over a pulley 58 fixed to the shaft 59 on which the wheel 54 is carried. The other end of the timing belt 57 is disposed over a pulley 60 fixed on shaft 61, which also has a gear 62 fixed thereon. The gear 62 is meshed with a drive gear 63 fixed on the shaft 18 for the first indexing wheel 17, whereby the shaft 61 and pulley 60 are turned in timed relation to shaft 18 and indexing wheel 17. With the structure described, the packages are guided during their entire movement from the conveyor 13 to the table 29, thus permitting a high speed of operation to be accomplished.

While the article feeding and stacking mechanism has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An article feeding and stacking mechanism, comprising:
  (a) article feeding means for supporting and feeding articles;
  (b) article receiving means for receiving a plurality of the articles in predetermined assembled relationship for further processing of the articles;
  (c) indexing wheel means between the article feeding means and article receiving means for receiving articles from the feeding means and delivering them in predetermined assembled relationship to the article receiving means;
  (d) said indexing wheel means including a plurality of angularly disposed article support pockets having intersecting surfaces thereon for engaging the articles as they are fed from the article feeding means and supporting the articles as the wheel means rotates;
  (e) a pair of rotatable control guide wheels adjacent the periphery of the indexing wheel means in alignment therewith and including a plurality of peripheral guide pockets having a curved shape;
  (f) the control guide wheels being rotatable in timed relation to each other and to the indexing wheel to move the guide pockets in proximity to articles being transmported on the support pocket surfaces of the indexing wheel means to prevent displacement of articles from the indexing wheel means as it rotates;

(g) the wheel means includes first and second indexing wheels rotatably supported in alignment and adjacent one another;

(h) the article supporting pockets on the first indexing wheel having a size to hold one article and the article supporting pockets on the second indexing wheel having a size to hold two articles;

(i) the indexing wheels being rotatable in timed relationship to cause the first wheel to turn twice as fast as the second wheel whereby the first wheel deposits two articles on the intermediate article support means before the second wheel picks them up;

(j) the control guide wheels being positioned relative to the indexing wheels such that the guide pockets, during their movement with the indexing wheels, remain in position to constrain movement of the articles supported on both of the indexing wheels during substantially the entire time the articles are on the indexing wheels in the transference of the articles from the article feeding means to the article receiving means; and (k) intermediate article support means located between said indexing wheels in a position to receive articles from the first indexing wheel as the first indexing wheel rotates, and to deliver the articles supported thereon to the second indexing wheel as it rotates past the intermediate article support means.

2. An article feeding and stacking mechanism as defined in claim 1 wherein said support pockets of said indexing wheel means have a recessed area at the intersection of the support surfaces to prevent damaging edge contact between the articles and support surfaces as they engage each other upon feeding into the indexing wheel.

3. An article feeding and stacking mechanism as defined in claim 1 wherein there are ten article supporting pockets on each of the indexing wheels.

4. An article feeding and stacking mechanism as defined in claim 1 wherein drive means are interconnected between the first and second indexing wheels and the control guide wheels to cause the timed rotation therebetween.

5. An article feeding and stacking mechanism as defined in claim 1 wherein the article support pockets are defined by projections disposed on the periphery of the indexing wheels, and the intersecting support surfaces being disposed at right angles with respect to one another.

6. An article feeding and stacking mechanism as defined in claim 5 wherein the indexing wheels each comprise a pair of spaced parallel disks with the disks of one indexing wheel being disposed in overlapping relationship to the other.

7. An article feeding and stacking mechanism as defined in claim 6 wherein the control guide wheels each comprise a pair of spaced parallel disks with the disks of one guide wheel being disposed in overlapping relationship to the other.

8. An article feeding and stacking mechanism as defined in claim 1 wherein pushing means is disposed adjacent the article receiving means to push a group of assembled articles to a station for subsequent processing of the group of articles.

9. An article feeding and stacking mechanism as defined in claim 1 wherein the curved guide pockets have an arcuate shape.

* * * * *